Dec. 25, 1956 P. CRAMMOND ET AL 2,774,989
MOLDING APPARATUS
Filed March 26, 1953 2 Sheets-Sheet 1
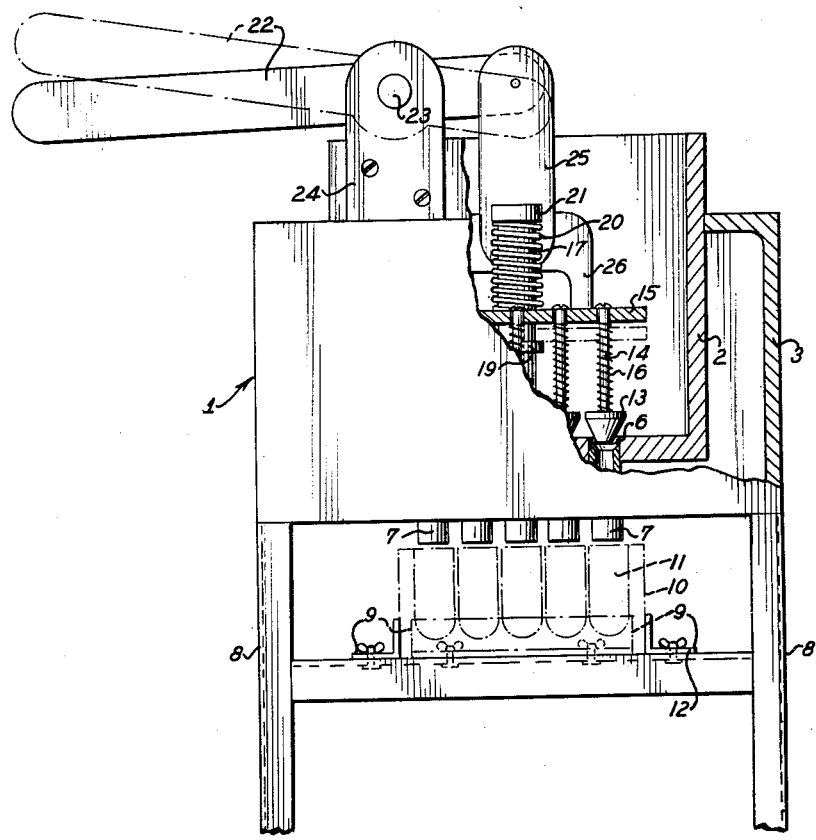
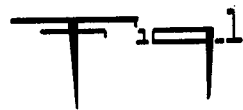
INVENTOR
PETER CRAMMOND
JOHN ERNEST DENNEY
BY *Fisher & Christen*
ATTORNEY Dec. 25, 1956  P. CRAMMOND ET AL  2,774,989
MOLDING APPARATUS
Filed March 26, 1953  2 Sheets-Sheet 2
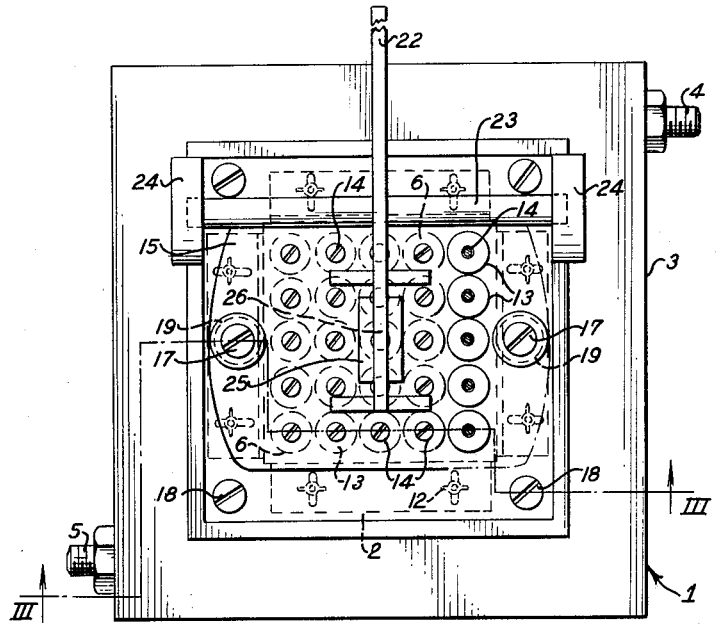
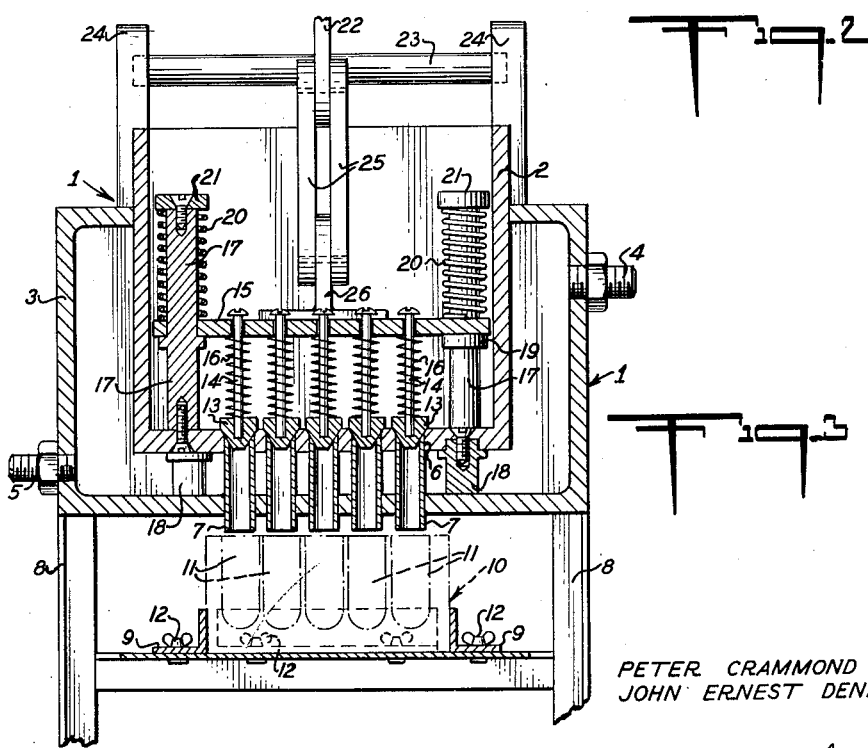
INVENTOR
PETER CRAMMOND
JOHN ERNEST DENNEY
BY *Fisher & Christen*
ATTORNEY United States Patent Office 2,774,989
Patented Dec. 25, 1956

2,774,989

MOLDING APPARATUS

Peter Crammond, Ruislip, and John Ernest Denney, Belvedere, England, assignors to Warner-Hudnut, Inc., New York, N. Y., a corporation of Delaware Application March 26, 1953, Serial No. 344,826

2 Claims. (Cl. 18—26)

The present invention relates to apparatus for pouring fluid thermoplastic substances into molds and other containers and is applicable with considerable advantage to the charging or filling of the multi-cavity molds as commonly used for molding thermoplastic substances, e. g. lipstick and suppository compounds, into the solid shapes in which such substances are used.

It is, of course, a common commercial practice to heat a thermoplastic substance until the substance is reduced to a fluid state and then to run the heated fluid into multi-cavity molds or into a series of containers in which the fluid substance is permitted to cool and more or less solidify. In thus handling certain thermoplastic substances, e. g. the quickly setting compounds from which lipsticks and suppositories are produced, it is highly desirable that the fluid substance should be cleanly poured into the centers of the mold cavities, thus avoiding pour marks in the solidified molded article. Therefore, care must be taken in pouring the substance into the mold cavities by hand or in locating a pouring nozzle in central relation to each mold cavity, in turn, in filling a series of mold cavities. Similarly, considerable care must be exercised in partly filling storage containers or packs with thermoplastic substances, if unsightly streaks of the solidified substance upon the inner surfaces of the exposed upper walls or the partly filled containers are to be avoided.

The observance of the required degree of care and skill in individually filling molds and containers with fluid thermoplastic substances requires an uneconomical amount of time and for this reason this invention is directed to an apparatus comprising a chamber for containing a fluid thermoplastic substance, means for heating the chamber in order to maintain the contents thereof in a fluid state, a plurality of passages leading from the chamber and arranged to discharge some part of the contents of the chamber into the mold cavities of a multi-cavity mold or into a plurality of single molds or containers presented thereto, and lift valve means or slide valve means controlled by a common control and adapted simultaneously to open or close the passages as required.

The primary object of this invention is to provide a modified and improved form of apparatus for accurately and cleanly pouring or filling a plurality of mold cavities or containers simultaneously in a single operation and in an expeditious manner. Other objects will be apparent to those skilled in the art from the following description:

According to the present invention, the apparatus comprises a chamber surrounded by a heating jacket and intended to contain a thermoplastic substance in the molten state, and a plurality of pouring spouts or nozzles leading from the chamber and extending downwardly therefrom so that the fluid contents of the chamber will flow by gravity through the spouts or nozzles, each pouring spout or nozzle having fitted thereto or associated therewith a valve which normally prevents the fluid substance from flowing downwardly through the pouring spout or nozzle, and a valve control means common to all of the valves for simultaneously displacing all the valves and permitting the fluid substance to discharge from all of the pouring spouts or nozzles at the same time, and wherein the inner end part of each pouring spout or nozzle which leads from the heated chamber is surrounded by a heating jacket while the valve for controlling the flow of the fluid substance through the spout or nozzle is disposed at the heated end thereof to prevent the fluid substance from being held in the unheated part of the spout or passage and becoming solidified therein when the valve is shut.

In a preferred form of the present invention, the bottom of the heated chamber may be enclosed by a heating jacket which defines a space for the circulation of a fluid heating medium or a housing for a heating element between the jacket and bottom of the chamber, and a plurality of discharge openings may be formed in the bottom of the chamber and each discharge opening may have connected thereto a tubular pouring spout or nozzle which extends downwardly across the jacketed heated space beneath the chamber and projects outwardly through the bottom of the heating jacket.

In the arrangement described in the preceding paragraphs, the valves may be of the self-closing or self-seating type and the valve-control means may be manually operable so that the valves are displaced manually to the open position in order to permit the discharge of the fluid substance from the pouring spouts or nozzles and are automatically returned to the closed position to prevent further discharge of the fluid substance from the pouring spouts or nozzles when the manual valve control means are released and restored to the inoperative position. Alternatively, the valve control means may be mechanically actuated, e. g. by power driven cam means.

The nature of the invention will hereinafter be further described by way of example and without implied limitation, with reference to the accompanying drawings which show an apparatus for filling multi-cavity molds with lipstick or suppository compounds.

In the drawings:

Fig. 1 is a part sectional elevation of an embodiment of the invention provided with manually operable valve control means shown operated to open the valve means;

Fig. 2 is a plan view thereof, showing parts broken away; and

Fig. 3 is a stepped sectional elevation taken on line III—III of Fig. 2, but showing the valve means and valve control means in the normal closed position.

The apparatus shown in the drawings comprises a vertical container 1 having a chamber 2 of any desired cross sectional shape, e. g. circular or rectilinear (as shown), supported on legs 18 in a heating jacket 3 which completely surrounds the bottom and side walls of the chamber 2. The heating jacket 3 provides space for the circulation of steam, hot water or other hot fluid around the walls and bottom of the chamber 2 and is provided with fluid-inlet and outlet connections 4, 5 for the passage of the hot fluid.

Alternatively, electrical heating elements (not shown) disposed internally and/or externally of the chamber 2 may be used for heating the contents of the chamber.

A plurality of discharge openings 6, e. g. twenty-five such openings as shown, are formed in the bottom of the heated chamber 2 and each opening is fitted with a tubular pouring spout or nozzle 7 (a so-called filling jet) which extends downwardly across the jacketed space beneath the chamber and projects outwardly through the bottom of the heating jacket 3. The outwardly projecting ends of the pouring spouts or nozzles 7 preferably extend for only a comparatively short distance from the bottom of the heating jacket so that the major part of each spout or nozzle is enclosed in the heating jacket.

The bottom of the container 1 is set upon feet or mounted upon a stand or bracket 8 to provide a clearance for the outwardly projecting ends of the pouring spouts or nozzles and may also be furnished or associated with guide or jig members 9, adjustable if necessary, which are arranged to locate the multi-cavity molds 10 with the mold cavities 11 thereof in centrally disposed co-axial relation to the pouring spouts or nozzles. As shown, the guide or jig members 9 comprise angle strips adjustably secured in position by wing nuts and screws 12 so that the position of the members 9 can be adjusted to centralise the mold cavities 11 in relation to the pouring spout 7.

The inner ends of the discharge openings in the bottom of the heated chamber, or the inner ends of the tubular pouring spouts or nozzles fitted therein, are formed with frustoconical seatings to receive valves formed by frustoconical valve plugs 13. Each valve plug 13 is carried at the lower end of a substantially vertical valve stem 14 the upper end of which is slidably engaged and retained in a carrier plate 15 disposed in the chamber 2 and set above the bottom of the chamber in substantially parallel relation thereto.

Each valve stem is surrounded by a helical compression spring 16 which is interposed between the corresponding valve plug 13 and the carrier plate 15 and thus serves resiliently to hold down the valve plug upon its seating when the carrier plate is in its normal i. e. lowermost position (as shown in Fig. 3).

The carrier plate 15 is slidably mounted upon two (as shown) or three or more substantially vertical guide posts 17 which are secured to and extend upwardly from the bottom of the chamber. Each vertical guide post 17 is provided with a shoulder 19 intermediate its ends forming a rest for the carrier plate and to limit the downward movement of the plate. The upper parts of the guide posts are surrounded by helical compression springs 20 which are interposed between the carrier plate and caps 21 secured to the upper ends of the guide posts so that the helical compression springs 20 serve resiliently to hold the carrier plate in its lowermost position i. e. in a position permitting the valve plugs to be seated upon their valve seats.

A manually operable lever 22 is fulcrumed upon a horizontal spindle 23 extending across the top of the container 1 and journalled at its ends in bearing brackets 24 secured to the container so that the lever rocks about a substantially horizontal axis and the handle end of the lever projects outwardly from the apparatus for convenient manipulation. The working end of the lever 22 is connected by downwardly extending pivotal connecting links 25 to a bracket or lug 26 secured to and upstanding from the carrier plate 15.

Alternatively, the lever 22 may be appropriately shaped and arranged for mechanical actuation by suitable power driving means.

The last described arrangement is such that when the lever 22 is appropriately rocked about its fulcrum 23 by hand (or mechanically), the carrier plate 15 is raised against the force of its loading springs 20 to the position shown in Fig. 1. The carrier plate in turn, lifts the valve stems 14 and valve plugs 13 so that the discharge openings 6 in the bottom of the chamber 2 are uncovered and the fluid contents of the chamber commence to flow through the pouring spouts or nozzles 7 and into the mold cavities 11 previously disposed beneath the lower projecting ends of the spouts and in co-axial relation thereto. The fluid substance can thus be deposited cleanly and accurately into the centre of each of the plurality of mold cavities 11 in the mold 10, in one and the same operation. Moreover, the location of the upper part of each pouring spout and its associated valve in the jacketed space beneath the chamber ensures that the fluid substances are prevented from being held in the unheated part of the spout and becoming solidified therein when the valve is shut.

The rate of flow of the fluid substance through the pouring spouts may be controlled by suitable manipulation of the valve-actuating lever and means may also be provided, if desired, for limiting the opening of the valve bodies and adjusting the opening limits thereof to control the rate of flow of fluid substances from the pouring spouts or nozzles.

Different valve means to those above described may be used for controlling the flow of fluid substance through the pouring spouts or nozzles. For example, a valve plate with orifices therein corresponding to the discharge openings 6 in the bottom of the chamber 2 may be slidably mounted upon the bottom of the chamber or so as to intersect the pouring spouts or nozzles 7 in such a manner that bodily displacement of the valve plate relatively to the chamber bottom and pouring spouts or nozzles will permit or interrupt the discharge of the fluid substance as required. The perforated valve plate may be displaced bodily through the medium of a pivotal hand lever or by power means if so desired and is preferably spring biased to return to the normally closed position.

The apparatus of this invention may be constructed simultaneously to pour or fill any required number of mold cavities or containers or packs according to the types of multi-cavity molds or filling racks in operation.

Furthermore, the apparatus may be adopted for substitution of one unit embodying the pouring spouts or nozzles for another unit having a different number and/or arrangement of pouring spouts or nozzles to suit different types of multi-cavity molds.

While the invention has been illustrated and described in the form of certain embodiments, it is intended to cover all such further embodiments as fall within the spirit and scope of the appended claims.

We claim:

1. Apparatus for molding thermoplastic materials comprising a chamber adapted to contain thermoplastic material in the molten state, said chamber having side walls and a bottom, a heating jacket surrounding said chamber and spaced from said side walls and bottom of said chamber, a plurality of pouring spouts open at each end extending downwardly from the bottom of said chamber and through the bottom of said heating jacket, valves positioned at the upper end of each of said pouring spouts, the upper ends of said pouring spouts comprising valve seats and said valves comprising plug valves adapted to be seated therein, each of said valves being carried by upwardly extending valve stems slidably supported by a carrier plate disposed in said chamber, said carrier plate slidably supported by upwardly extending guide members, lever means coupled to said carrier plate for raising said plate, spring means for urging said plate to its lowermost position in the chamber, and spring means for urging said valves into engagement with said valve seats.

2. Apparatus set forth in claim 1 including a support carrying a plurality of molds positioned beneath said jacketed chamber and guide means for positioning said molds in registry with said pouring spouts.

References Cited in the file of this patent
UNITED STATES PATENTS

| | | |
|---|---|---|
| 724,341 | Sheffield | Mar. 31, 1903 |
| 735,304 | Schnetzer | Aug. 4, 1903 |
| 1,514,359 | York | Nov. 4, 1924 |
| 1,541,999 | Paley | June 16, 1925 |